United States Patent [19]
Van Leest

[11] Patent Number: 5,973,938
[45] Date of Patent: Oct. 26, 1999

[54] SWITCHED-MODE POWER SUPPLY

[75] Inventor: Paulus J. C. Van Leest, Groningen, Netherlands

[73] Assignee: U.S. Philips Corporation, New York, N.Y.

[21] Appl. No.: 09/072,113

[22] Filed: May 4, 1998

[30] Foreign Application Priority Data

May 14, 1997 [EP]  European Pat. Off. .............. 97201451

[51] Int. Cl.$^6$ ................................................. H02M 03/335
[52] U.S. Cl. ................................ 363/20; 363/17; 363/19; 363/21
[58] Field of Search .................................. 363/20, 19, 17, 363/18, 21; 320/114, 115, 162, 142

[56] References Cited

U.S. PATENT DOCUMENTS 4,652,984  3/1987  Van Der Akker et al. ............... 363/18
5,610,804  3/1997  Shimizu ..................................... 363/21

FOREIGN PATENT DOCUMENTS 9501000  1/1995  WIPO .

Primary Examiner—Peter S. Wong
Assistant Examiner—Rajnikant B. Patel
Attorney, Agent, or Firm—Ernestine C. Bartlett; Leroy Eason

[57] ABSTRACT

A switched-mode power supply comprises a transformer (2) having a primary winding (4) connected to a first pair of direct voltage terminals (8, 10) via a switching transistor (6) and having a secondary winding (22) which powers a load (24) via a diode (26). The switched-mode power supply further comprises a second switching transistor (34) which, together with the secondary winding (22), the load (24) the diode (26) and a second pair of direct voltage terminals (38, 40) is configured as a forward converter to power the load from a comparatively low direct voltage (12 V d.c.) supply.

7 Claims, 3 Drawing Sheets

5,973,938

SWITCHED-MODE POWER SUPPLY

BACKGROUND OF THE INVENTION

The invention relates to a switched-mode power supply comprising a transformer having a primary winding connected to a first pair of direct voltage terminals in a primary circuit via a first controllable switching element and having a secondary winding included in a secondary circuit via a unidirectional element and a load to be powered.

A switched-mode power supply of the type defined in the opening paragraph is known from U.S. Pat. No. 4,652,984 and can be used for charging batteries and for powering electrical equipment. Such a power-supply circuit is particularly suitable for an electric shaver having rechargeable batteries, the power-supply circuit supplying the charging current for the batteries and the current for powering the motor of the shaver. Said Patent discloses a flyback-type self-oscillating switched-mode power supply having a transformer. The transformer permits an adaptation between the comparatively low voltage of the rechargeable battery and/ or of the shaver motor and the comparatively high rectified mains voltage. The duty cycle of the first controllable switching element, generally a switching transistor, can thus remain within practical limits. It is possible to operate this known switched-mode power supply with a lower input voltage, for example 12 V d.c. or 24 V d.c., instead of the normal mains voltage though, on account of the transformation ratio, the maximum possible charging current for the rechargeable battery is smaller than attainable in the case of a transformation ratio adapted to this end.

In the International Application No. WO 95/01000 this problem is remedied by means of a switched-mode power supply which uses a transformer having two primary windings, each having a separate switching element. The associated primary winding and switching element are put into operation depending on the applied input voltage, i.e. the rectified mains voltage or 12 V direct voltage. This results in an optimum adaptation for the different input voltages. However, a drawback of this solution is that it requires a transformer having two separate primary windings, which complicates the design of the transformer.

SUMMARY OF THE INVENTION

It is an object of the invention to provide a switched-mode power supply which mitigates the afore-mentioned drawbacks. To this end, the switched-mode power supply of the type defined in the opening paragraph is characterized in that the switched-mode power supply further comprises a second controllable switching element which, in series with the secondary winding and the load to be powered, is connected to a second pair of direct voltage terminals.

The secondary winding and the second switching element form a forward or buck converter, which is very suitable for supplying a large current if the difference between the applied voltage and the desired voltage is not too large. In this way, it is possible to obtain a large charging current for a 12 V d.c. input voltage or any other comparatively low direct voltage by disabling the first switching element and enabling the second switching element by means of appropriate electronic control circuitry.

Various advantageous variants as regards the manner in which the secondary circuit and the primary circuit are connected to one another and are connected to the input voltage terminals are defined in the appendant Claims. The primary circuit can be energized with a rectified a.c. mains voltage. The direct voltage terminals of the secondary circuit can be connected upstream or downstream of the rectifier for the a.c. mains voltage. In the last-mentioned case the rectifier and any filter components must be capable of handling the larger currents which flow when the second switching element is operative and the switched-mode power supply operates as a forward converter.

If desired, the 12 V direct voltage can also be applied to the secondary circuit via one or two separate terminals. Plugging the 12 V into separate terminals enables a simple 12 V detection, plugging-in causing the drive to the first switching element to be turned off and that to the second switching element to be turned on.

In certain configurations a mechanical or electrical switch in series with one of the terminals of the second pair of direct voltage terminals of the secondary circuit prevents a current flowing from the primary circuit to the secondary circuit or vice versa. This switch can also be activated by plugging the 12 V into the afore-mentioned separate terminals.

The invention may also be regarded as an extension to an existing forward converter, in which case it concerns a switched-mode power supply comprising: a first series arrangement of an inductive element, a controllable switching element and a load to be powered, and a second series arrangement of the inductive element, the load to be powered and a unidirectional element, characterized in that the inductive element is a winding of a transformer having another winding arranged in series with a further controllable switching element to receive a direct voltage. The further winding and the further controllable switching element correspond to the afore-mentioned primary winding and the first controllable switching element.

BRIEF DESCRIPTION OF THE DRAWINGS

These and other aspects of the invention will be elucidated with reference to the accompanying drawings, in which.

In these Figures elements having a similar function or purpose bear the same reference signs.

DESCRIPTION OF THE PREFERRED EMBODIMENTS

Figure 1:
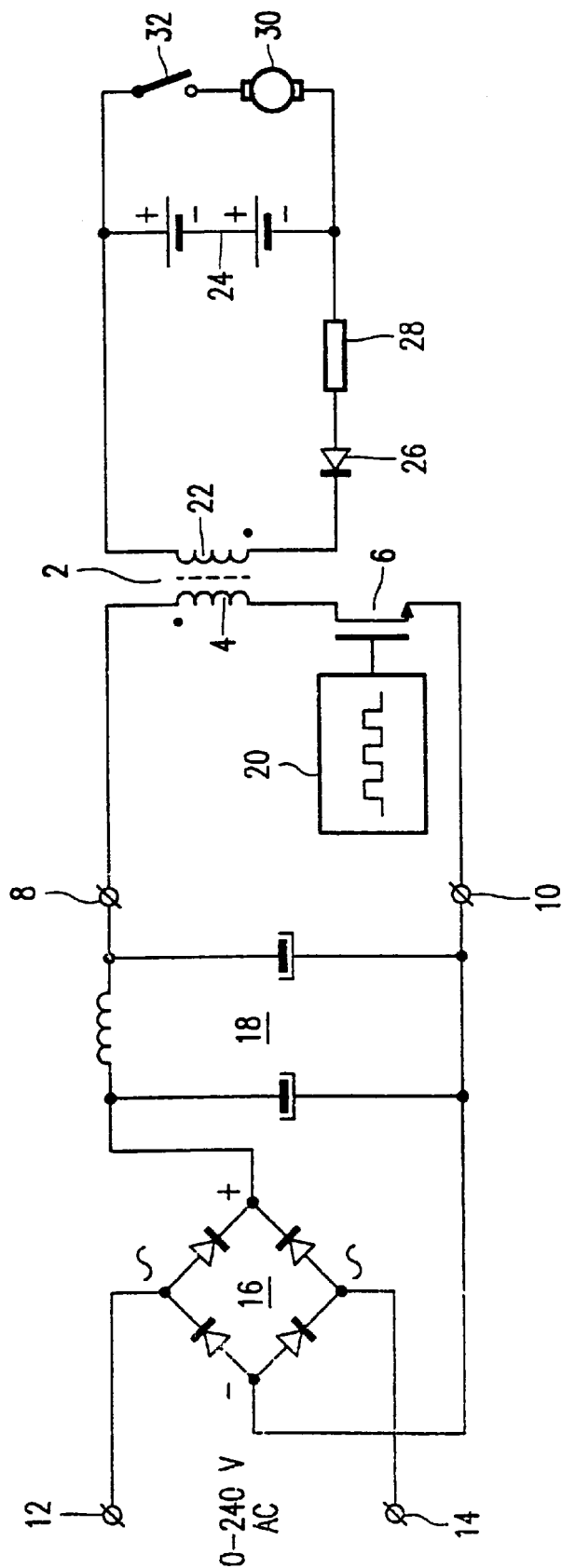
FIG. 1 shows a prior-art switched-mode power supply.

FIG. 1 shows a prior-art switched-mode power supply. The power supply comprises a transformer 2 having a primary winding 4 connected to a first pair of direct voltage terminals 8 and 10 via a first controllable switching element, in the present example a field effect transistor 6. A direct voltage can be applied directly to the direct voltage terminals 8 and 10 but it is also possible to apply a rectified alternating voltage, for example the a.c. mains voltage. For this purpose, there have been provided two input voltage terminals 12 and 14, to which the a.c. mains voltage can be applied, a bridge rectifier 16 and a smoothing filter 18. Thus, the primary winding 4 is included in a primary circuit, which is periodically opened by means of the switching transistor 6 under control of a control circuit 20. The transformer 2 further comprises a secondary winding 22 to which a load, in the present example a rechargeable battery 24, is connected via a unidirectional element, in the present case a diode 26, and an optional series resistor 28. The battery 24 and the switched-mode power supply can be incorporated in an electric shaver whose motor 30 is connected to the battery 24 via a switch 32.

The configuration operates as a flyback converter. When the switching transistor 6 conducts the diode 26 is cut off; magnetic energy is then built up in the transformer 2. When the switching transistor 6 is cut off the diode 26 conducts and the built-up magnetic energy is supplied to the load, in the present case the battery 24, via the diode 26. The switching transistor 6 can be controlled, for example, in a manner as known from the afore-mentioned U.S. Pat. No. 4,652,984 but many alternative manners are known from the technical literature, and integrated circuits designed specifically for this purpose are commercially available. The output voltage across the load or the output current through the load is controlled by controlling the duty cycle and/or the frequency with which the switching transistor 6 is turned on and turned off. In this way, it is also possible to cope with variations in the direct voltage applied to the direct voltage terminals 8 and 10. The transformer makes it possible to achieve an adaptation between the high rectified mains voltage and the generally much lower voltage across the load to be powered, without having to revert to an impermissibly small duty cycle and/or low switching frequency.

However, for many portable rechargeable devices it is desirable that charging is possible not only from the a.c. mains but also from a d.c. mains with a comparatively low voltage such as the battery voltage in road vehicles and nautical vessels. A frequently used voltage is, for example 12 V d.c. but other voltages such as 24 V d.c. occur likewise. The description as well as the Figures are based on 12 V d.c. but it is obvious that any other direct voltage is also possible. The 12 V d.c. can be applied to the direct voltage terminals 8 and 10 or, if desired, to the terminals 12 and 14 and it is possible to construct the switched-mode power supply in such a manner that it remains operative at this low input voltage. However, the maximum current which can be supplied to the load is still limited as a result of the winding ratio of the transformer 2. Charging of the battery 2 then requires a substantially longer time than in the case of the much higher mains voltage.

Figure 2:
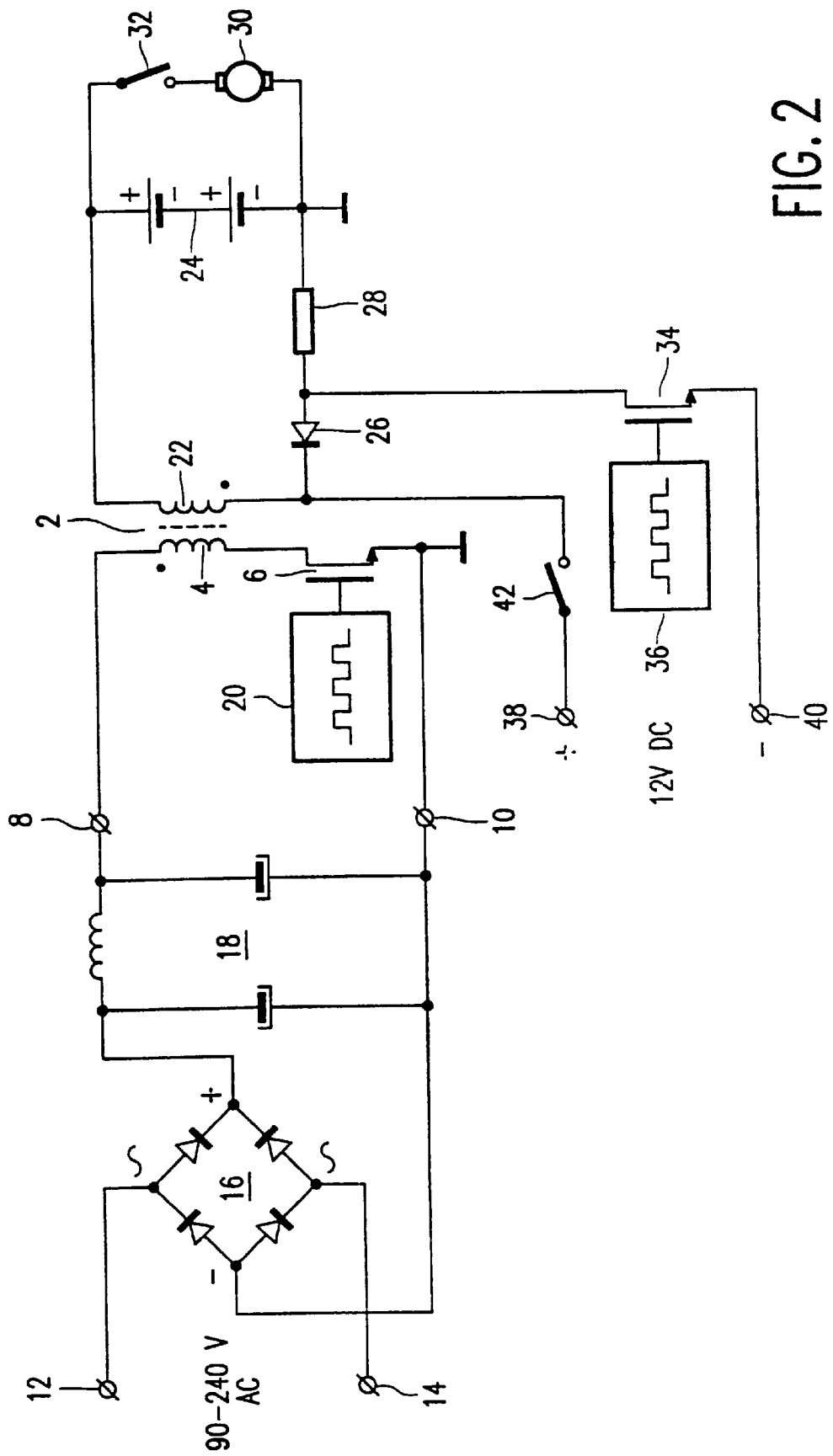
FIG. 2 shows an embodiment of a switched-mode power supply in accordance with the invention.
Figure 3:
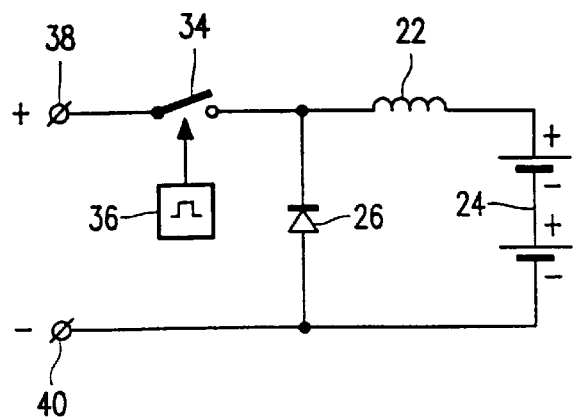
FIG. 3 shows a known configuration of a switched-mode power supply.
Figure 4:
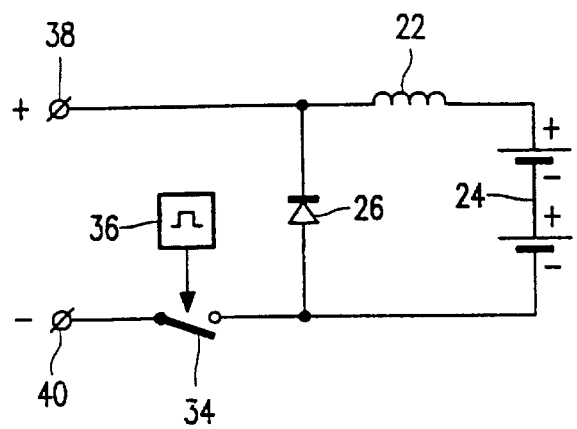
FIG. 4 shows a variant of the configuration of the switched-mode power supply shown in FIG. 3.

FIG. 2 shows a switched-mode power supply in accordance with the invention, which mitigates this drawback. The diagram shown is similar to that shown in FIG. 1 but a second controllable switching element has been added, again formed by a switching transistor 34, which together with the secondary winding 22, the diode 26, a control circuit 36 and a second pair of direct voltage terminals 38 and 40, is arranged as a forward converter. FIG. 3 shows the basic diagram of a forward converter, which is known per se. FIG. 4 shows a variant of the forward converter of FIG. 3, used in the switched-mode power supply shown in FIG. 2. In FIG. 2 the 12 V d.c. voltage source is connected to the direct voltage terminals 38 and 40. One of the direct voltage terminals, in the present case the direct voltage terminal 38, is connected to the node between the secondary winding 22 and the diode 26 via a switch 42. The other direct voltage terminal 40 is connected via switching transistor 34 to the node between the diode 26 and the load to be powered, in the present case the battery 24. The resistor 28 between the diode 26 and the battery 28 is optional and may be dispensed with.

The second pair of direct voltage terminals 38 and 40 can be arranged, as shown, as separate terminals, but can instead be connected to the first pair of direct voltage terminals 8 and 10 or directly to the input voltage terminals 12 and 14. The switch 42 is closed when 12 V is supplied. The switch 42, which can be a mechanical or electrical switch, inhibits undesired currents from the secondary circuit to the primary circuit in the case that the second pair of direct voltage terminals 38 and 40 has been connected to the first pair of direct voltage terminals 8 and 10 or to the input voltage terminals 12 and 14, and also in the case that the primary circuit and the secondary circuit have a common ground as shown in FIG. 2. It is alternatively possible to arrange only the direct voltage terminal 38 as a separate terminal and to connect the other direct voltage terminal 40 to the input voltage terminal 14. Arranging at least one of the direct voltage terminals 38 and 40 as a separate terminal has the advantage that the 12 V d.c. detection can be implemented by simple mechanical means. Plugging in the 12 V d.c. activates the switch 42, the control circuit 36 and deactivates the control circuit 20.

The control circuits 20 and 36 can be separate units but it is likewise possible to use a single control circuit in order to control the switching transistor 6 or the switching transistor 34. Switching from 12 V d.c. operation to a.c. mains operation can be effected manually, automatically by measuring the applied voltage, or electromechanically by plugging into separate terminals.

The invention is by no means limited to the embodiments shown and described herein. In addition to the flyback configuration shown herein, there are other switched-mode power supply configurations, known from the technical literature, in which a transformer is used. In these configurations it is also possible to form an arrangement as shown in FIGS. 3 and 4 by means of a second controllable switching element and the secondary winding of the transformer.

The invention may also be regarded as an extension to an existing forward converter of the type as shown in FIGS. 3 and 4. In that case the switched-mode power supply comprises a first series arrangement of an inductive element 22, a controllable switching element 34 and a load 24 to be powered, and as shown in FIG. 2 a second series arrangement of the inductive element 22, the load 24 to be powered and a unidirectional element, generally a diode 26, the inductive element 22 being a winding of a transformer 2 having another winding 4 arranged in series with a further controllable switching element 6 to receive a direct voltage on the terminals 8 and 10.

Figure 5:
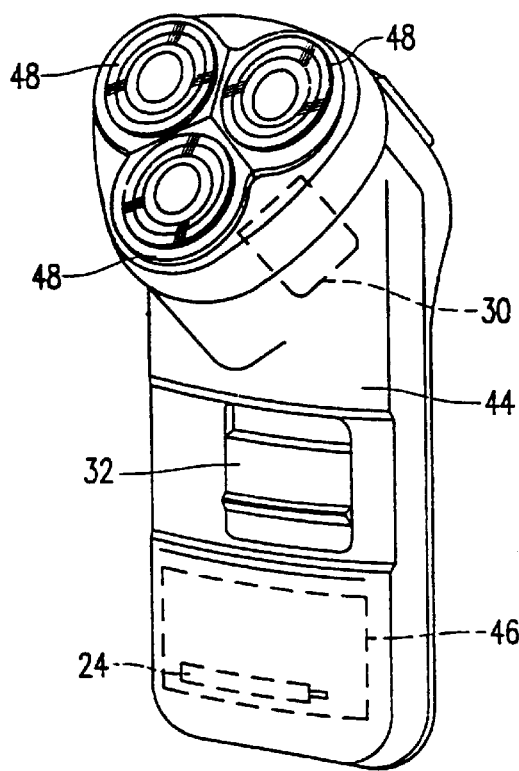
FIG. 5 shows an electric shaver having a rechargeable battery and a switched-mode power supply in accordance with the invention.

The switched-mode power supply is suitable for electrical devices using rechargeable batteries, for example NiCd or NiMH batteries, which are charged from the mains voltage and/or a battery voltage of, for example, 12 V d.c. FIG. 5 shows an electric shaver having a housing 44, which accommodates the switched-mode power supply 46, the rechargeable battery 24 and the motor 30. The motor 30 drives the shaving heads 48 and is actuated by means of the switch 32.

I claim:

1. A switched-mode power supply comprising a transformer having a primary winding (4) connected to a first pair of direct voltage supply terminals (8, 10) in a primary circuit via a first controllable switching element (6), said transformer further having a secondary winding (22) in a secondary circuit in which it is connected via a unidirectional element (26) to a load to be powered; characterized in that said power supply further comprises a second controllable switching element (34) which, in series with the secondary winding (22) and the load to be powered, is connected to a second pair of direct voltage supply terminals (38, 40).

2. A switched-mode power supply as claimed in claim 1, wherein the second pair of direct voltage supply terminals (38, 40) is connected to the first pair of direct voltage supply terminals (8, 10).

3. A switched-mode power supply as claimed in claim 1, wherein the first pair of direct voltage supply terminals (8, 10) is connected to AC supply terminals via a rectifier bridge (16).

4. A switched-mode power supply as claimed in claim 1, wherein one terminal of the second pair of direct voltage supply terminals (38, 40) is connected to one terminal of an AC supply.

5. A switched-mode power supply as claimed in claim 4, wherein the AC supply is connected to the first pair of direct voltage supply terminals (8, 10) via a rectifier bridge (16).

6. A switched-mode power supply as claimed in claim 1, wherein one terminal (38) of the second pair of direct voltage supply terminals (38, 40) is connected to a node between a secondary winding (22) and the unidirectional element (26) via a switch (42), and the second controllable switching element (34) is connected between said node and the other terminal (40) of said second pair of direct voltage supply terminals.

7. An electric shaver comprising: a rechargeable battery, an electric motor, a switch (32) for connecting the motor to the battery and a switched-mode power supply as claimed in claim 1 for energizing either or both of the battery and the motor.

* * * * *